3,126,988
POWER TRANSMISSION DEVICE
James A. Memmer, Washington, Ill., assignor to LeTourneau-Westinghouse Company, Peoria, Ill., a corporation of Illinois
Filed Mar. 23, 1961, Ser. No. 97,948
4 Claims. (Cl. 192—3.5)

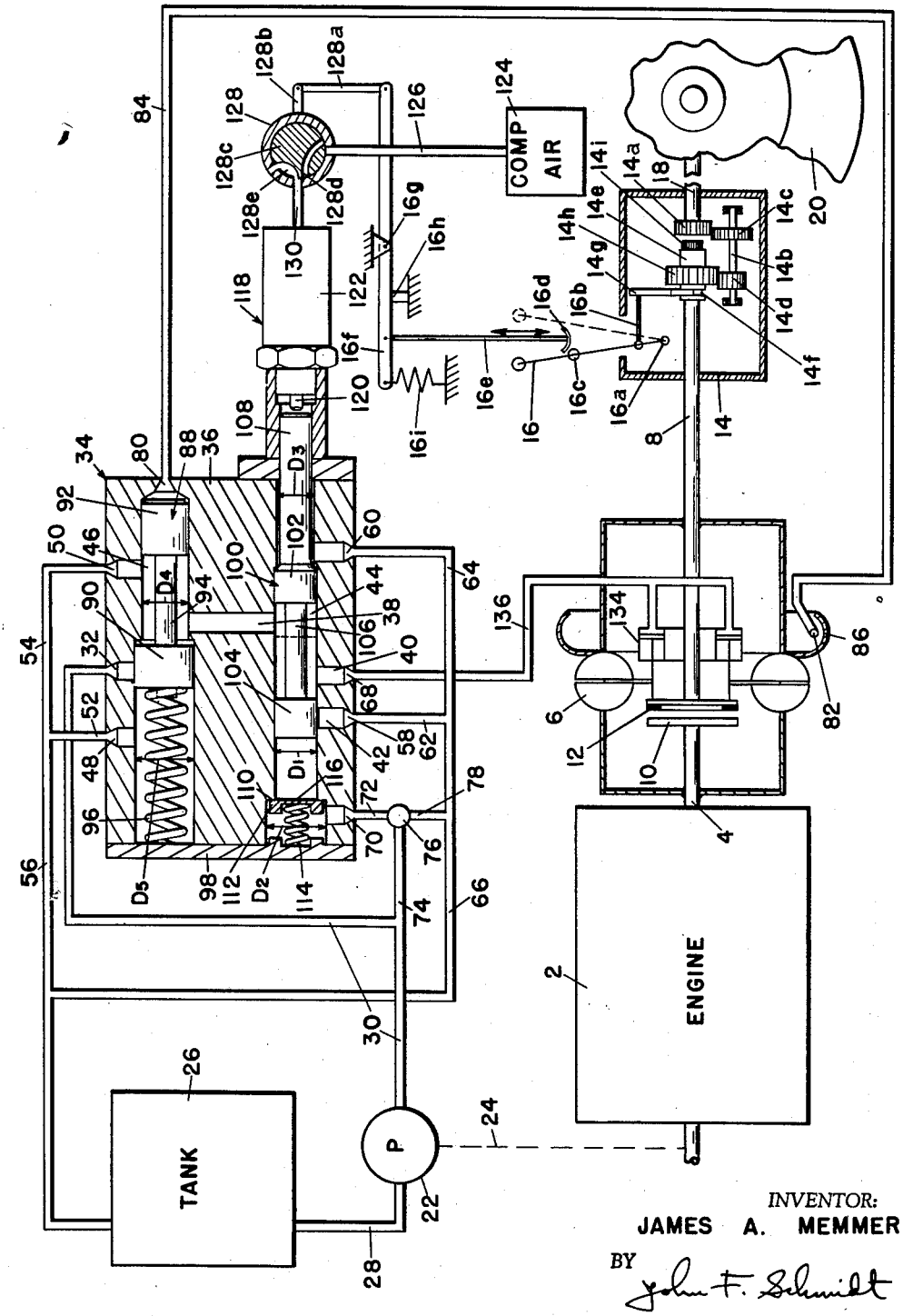

This invention relates to power transmission devices, and more particularly to a shiftable change-speed device equipped with a torque converter and a clutch for direct drive. This application is a continuation-in-part of my application 62,195, filed October 12, 1960, now abandoned.

In devices of the type referred to, after a given speed is reached, the clutch is automatically engaged in order to accomplish direct drive from the engine to the change-speed gear box, thus avoiding the power losses which are inherent in today's torque converters. If shifting is done while the lockup clutch is engaged, there is too great a shock to the drive train. It is therefore desirable to accomplish some means of disengaging the direct drive clutch during the shifting operation and then reengaging the clutch after the shifting operation has been completed. Desirably, this should be accomplished automatically.

It is accordingly an object of this invention to provide a clutch which is engaged under predetermined conditions to avoid the losses inherent in torque converters, the clutch being disengaged automatically during the shifting operation and being reengaged after the shifting operation has been completed. The sole figure of the drawing shows an engine 2 of any conventional type, such as the internal combustion engines used in earthmovers (scrapers, tractors, trucks, and the like). The engine 2 is equipped with an output shaft 4, to which there is connected a torque converter 6. Torque converter 6 is connected with its output shaft 8. A clutch is also shown as connected with the shafts 4 and 8. Thus, a driving disk 10 of a clutch is shown to be engageable with a driven disk 12, disk 10 being driven by engine output shaft 4, and disk 12 being connected to drive the output shaft 8. Output shaft 8 delivers its torque to a change-speed gear box of any suitable design, gear box 14 being here shown as one of a type which is manipulated by an operator by means of a lever 16. Change-speed gear box 14 delivers its torque to a propeller shaft 18 which is connected in any suitable manner with the vehicle drive wheels, one of which is shown at 20.

The details of transmission 14 will be readily understood by those skilled in the art and do not need to be disclosed here. In order to illustrate the principle involved, it will suffice here to show a simple 2-speed sliding gear transmission. Thus, transmission 14 includes an output gear 14a secured to propeller shaft 18 and rotatable therewith. A countershaft 14b is rotatably mounted in the transmission housing on suitable bearings and carries gears 14c and 14d. Gear 14c is always in mesh with gear 14a.

Output shaft 8 of the torque converter is substantially coaxial with propeller shaft 18, and extends into the transmission housing and ends close to gear 14a. The end of shaft 8 is splined and carries a sleeve 14e which is internally splined so as to be axially shiftable on shaft 8. The sleeve 14e is grooved as shown at 14f, and a shifter fork 14g engages the groove 14f. A gear 14h is secured on, or may be integral with, sleeve 14e and meshes with gear 14d in the operating position shown in the drawing. Gear 14a, in addition to the external gear teeth shown in the drawing, is provided with internal teeth to mesh with the external teeth of a gear 14i provided on the end of sleeve 14e.

Lever 16 is shown as pivoted at 16a and is pivotally connected to shifter fork 14g by any suitable connection 16b. Lever 16 carries a roller cam 16c which is adapted to engage a vertically movable cam follower 16d. Cam follower 16d is mounted on vertically movable rod 16e which pivotally engages a lever 16f.

Lever 16f is pivotally mounted at 16g. A stop 16h limits the counterclockwise pivoting of lever 16f. A spring 16i biases the lever 16f into engagement with the stop 16h.

The hydraulic circuit will now be described. Any suitable pump 22 is connected to be driven by engine 2 through a drive connection indicated schematically at 24. Pump 22 receives hydraulic fluid from a tank or reservoir 26 through a supply conduit 28. Pump 22 delivers fluid under pressure through a conduit 30 to a supply port 32 of a valve indicated generally at 34. Valve 34 includes a body 36 provided with a number of bores and passages. A first passage 38 in the valve body connects with a second passage 40 and a third passage 42 by way of a fourth passage 44. (The foregoing refers to structure; in operation, first passage 38 never communicates with third passage 42, as will be seen later.) All of the passages referred to are provided in the valve body 36, in the embodiment here shown.

The fourth passage 44 referred to above is actually a stepped bore having a diameter $D_1$ and a somewhat larger diameter $D_2$. Still another, somewhat smaller, diameter $D_3$ is provided as a part of the bore referred to above as fourth passage 44.

A second bore 46, also stepped, is provided in the valve body 36. Bore 46 is provided with a given diameter $D_4$ and a somewhat larger diameter $D_5$. Bore 46 is in communication with the first passage 38 referred to above. Bore 46 is also in communication with supply port 32 referred to above and with other ports 48 and 50. Ports 48 and 50 connect with the tank or reservoir 26 by means of conduits 52, 54, and 56.

Other ports 58 and 60 in the valve body connect with the tank or reservoir 26 by means of conduits 62, 64, 66, and the aforementioned conduit 56. Two other ports 68 and 70 are provided in the valve body, port 68 connecting the passage 40 with the clutch engaging mechanism to be referred to later, and port 70 connecting the $D_2$ portion of bore 44 with a second source of supply 72. It will be understood by those skilled in the art that the source of fluid under pressure 72 may be any suitable low pressure source. For convenience, the source 72 is here shown as connected with pump 22 and conduit 30 by means of a conduit 74 and a pressure regulating valve 76. Pressure regulating valve 76 is connected with exhaust conduit 66 by a conduit 78.

Still another port is provided in the valve body 36, namely a port 80 which communicates the right end of bore 46 with a Pitot tube 82 by way of a conduit 84. Pitot tube 82 is disposed in a centrifugal device 86 secured to or connected to be driven by the torque converter 6.

A spool indicated generally at 88 is disposed in the bore 46. Spool 88 includes a land 90 operating in the $D_5$ portion of bore 46, and a land 92 operating in the $D_4$ portion of bore 46. The two lands 90 and 92 of spool 88 are connected by a shaft portion 94. Spool 88 is biased toward the right as seen in bore 46 by a spring 96 compressed between the left face of land 90 and a cover 98.

A passage connecting means in the form of a second spool indicated generally at 100 is disposed in the stepped bore 44. Spool 100 consists of lands 102 and 104 operating in the $D_1$ portion of the bore and connected by a shaft 106, and an actuator 108 extending beyond the limits of the valve body 36.

At the point or plane where the $D_1$ and $D_2$ portions of bore 44 come together, there is formed a shoulder 110. Shoulder 110 forms a seat for a check valve 112 which is biased against seat 110 by a spring 114. Valve 112 is movable to the left in the $D_2$ portion of bore 44 against the bias of spring 114 to provide unobstructed flow from the $D_1$ portion to the $D_2$ portion; valve 112 is ported by an orifice 116 to permit restricted flow from the $D_2$ portion of the bore to the $D_1$ portion.

At the right end of the valve body 36, substantially coaxial with the bore 44, there is mounted an operating device indicated generally at 118. The device 118 constitutes part of means operable during shifting of the gears to move the spool 100 into its second operating position from the first operating position shown in the drawing, against the bias of pressure operating in the $D_1$ portion of bore 44. Thus, in the embodiment shown, the device 118 is operated by fluid under pressure. More specifically, the device 118 is a simple air motor, being any one of a number of suitable types available commercially which need not be described in detail here. Suffice it to say that the air motor 118 is provided with an operating shaft 120 which is held in its position as shown in the drawing by a spring, not shown. Air under pressure is admitted to cylinder 122 from a source of compressed air 124, by way of a conduit 126, a valve 128, and another conduit 130.

Lever 16f referred to above is pivotally connected with valve 128 by a link 128a and an operating arm 128b. Arm 128b is connected to element 128c of valve 128. Element 128c is provided with a passage 128d which, in one operating position, connects conduits 126 and 130. Another passage 128e is provided in element 128c in order to vent conduit 130 to atmosphere when the parts are in the operating position shown.

Reference was made above to the mechanism for engaging the clutch for direct drive of shaft 8 by shaft 4 instead of going through the flexible drive provided by the torque converter 6. A fluid motor 134 is shown in the drawing as being connected with the port 68 of valve 34 by way of a conduit 136. Fluid motor 134 is preferably an annular type of motor, being one of a number of commercially available types which need not be described in detail. The motor 134 is connected in any suitable way to engage and disengage the clutch 10, 12 shown in the drawing.

*Operation*

At relatively slow speeds, little pressure is manifested at the Pitot tube 82, and spring 96 holds spool 88 in the position shown. As engine speed increases, the pressure in port 80 builds up to a value sufficient to enable land 92, acting as a piston, to overcome the bias of spring 96.

As soon as port 32 is uncovered, the supply pressure of pump 22 quickly snaps spool 88 to the left, because the area of land 90 exposed to supply pressure is greater than that of land 92. Supply pressure is then applied via passages 38, 44, and 40, and conduit 136, to clutch actuating motor 134, and clutch 10, 12 is engaged, or "locked up." The result is direct drive of shaft 8 by engine 2, by-passing the torque converter 6.

Let it now be supposed that transmission 14 is operated or "shifted," either automatically or manually. As the operator begins to move shift lever 16, roller cam 16c engages cam follower 16d, lifting the cam follower and pivoting lever 16f clockwise about its pivot 16g.

The aforesaid clockwise movement causes valve element 128c to pivot clockwise so that passage 128d connects the compressed air source 124 with operating device 118 via conduits 126 and 130. Device 118 thereupon thrusts shaft 120 leftward against actuator 108, shifting spool 100 to the left. This movement of spool 100 is readily accomplished, because check valve 112 is easily moved off its seat 110 against the bias of soft spring 114. Fluid is discharged from bore 44 by this leftward movement of spool 100, leaving via port 70 and pressure regulating valve 76, to conduits 78, 66, and 56, and tank 26.

Spool 100 is shifted leftward until the left face of land 102 is approximately in the position shown by the dotted line, in which position land 102 covers passage 38 and land 104 uncovers passage 42. Conduit 136 is thereupon connected with tank 26 via passages 40, 44, and 42 and conduits 62, 66, and 56, permitting clutch 10, 12 to disengage. The engine then drives the vehicle through the torque converter while the shifting of gears takes place.

The energization of device 118 is only momentary, because as the engagement of external gear 14i with internal gear 14a is completed, roller cam 16c rides out from under the cam follower 16d. Spring 16i thereupon returns lever 16f and element 128c to the position shown in the drawing, in which position passage 128e vents the device 118 to atmosphere by way of conduit 130, whereupon shaft 120 quickly returns to its retracted position, shown in the drawing. If spool 100 were free to follow shaft 120 to the right, the drive between crankshaft 4 and output shaft 8 would quickly return to direct drive, with clutch 10, 12 "locked up," before the transmission had completed the shifting operation. However, as soon as shaft 120 is withdrawn and spool 100 begins to move to the right, spring 114 quickly seats check valve 112, whereupon the only communication between the left face of land 104 and pressure source 72 is through the bleed orifice 116. Fluid therefore flows quite slowly back into the $D_1$ portion of bore 44, with the result that spool 100 returns slowly to the position shown in the drawing. This time delay permits completion of the shifting operation before clutch 10, 12 can again be engaged.

With spool 100 back in the position shown, clutch 10, 12 is engaged if the device 86 is rotating at a sufficient speed, as described above. Thus, the shifting of gears in transmission 14 is accomplished while the engine drives the output shaft through torque converter 6.

It will be apparent that this invention provides means for releasing the direct-drive clutch during shifting of gears in the transmission, thus reducing the shock to the drive train. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. In a vehicle having an engine, a change-speed gear box, a flexible drive between the engine and the gear box, and a clutch engageable to effect direct drive instead of flexible drive and operated by fluid pressure responsive mechanism, the invention consisting of means to disengage the clutch during shifting of gears and comprising: a valve body having a first passage to receive fluid under pressure, a second passage to deliver fluid under pressure to said mechanism, a third passage for spent fluid, and a stepped bore interconnecting the first, second, and third passages; a spool movable in the stepped bore and having a first operating position in which the first and second passages are connected and a second operating position in which the second and third passages are connected; means to supply fluid under pressure connected with the stepped bore to bias the spool into its first operating position; a check valve in the stepped bore to permit ready fluid flow from the stepped bore toward the fluid supply means and having a restricted passage to permit limited fluid flow from the fluid supply means toward the spool; and means operable during shifting of the gears to move the spool into its second operating position against the bias of said fluid supply means.

2. In a vehicle having an engine, a change-speed gear box, a flexible drive between the engine and the gear box, and a clutch engageable to effect direct drive instead of flexible drive and operated by fluid pressure responsive mechanism, means to disengage the clutch during shifting of gears comprising: a first passage to receive fluid under pressure; a second passage to deliver fluid under pressure to said mechanism; a third passage for spent fluid; a fourth passage interconnecting the first, second, and third passages; passage connecting means movable in the fourth passage and having an operating position in which the first and second passages are connected and another operating position in which the second and third passages are connected; means biasing the passage connecting means into its first-named operating position and including means to supply fluid under pressure connected with the fourth passage, and a check valve in the fourth passage between the connecting means and said fluid supply means, the check valve permitting ready fluid flow from the fourth passage toward the fluid supply means and having a bleed port to permit restricted fluid flow from the fluid supply means to the fourth passage; and means operable during shifting of the gears to move the passage connecting means into its second-named operating position against said biasing means.

3. In a vehicle having an engine, a change-speed gear box, a flexible drive between the engine and the gear box, and a clutch engageable to effect direct drive instead of flexible drive and operated by fluid pressure responsive mechanism, the invention consisting of means to disengage the clutch during shifting of gears and comprising: a valve body having a first passage to receive fluid under pressure, a second passage to deliver fluid under pressure to said mechanism, a third passage for spent fluid, and a fourth passage providing communication among the first, second, and third passages; passage connecting means movable in the fourth passage and having a first operating position in which the first and second passages are connected and a second operating position in which the second and third passages are connected; a source of pressure connected with the fourth passage to bias the passage connecting means into its first operating position; means operable during shifting of the gears to move the passage connecting means into its second operating position against the bias of the pressure source; and a check valve in the fourth passage to permit ready fluid flow from the fourth passage toward the pressure source and having a restricted passage to permit limited fluid flow from said source toward the passage connecting means.

4. In a vehicle having an engine, a change-speed gear box, a flexible drive between the engine and the gear box, and a clutch engageable to effect direct drive instead of flexible drive and operated by fluid pressure responsive mechanism, means to disengage the clutch during shifting of gears comprising: a first passage to receive fluid under pressure, a second passage to deliver fluid under pressure to said mechanism, a third passage for spent fluid, a fourth passage interconnecting the first, second, and third passages, passage connecting means movable in the fourth passage and having an operating position in which the first and second passages are connected and another operating position in which the second and third passages are connected, means biasing the passage connecting means into its first-named operating position and including means to supply fluid under pressure connected with the fourth passage, means operable during shifting of the gears to move the passage connecting means into its second-named operating position against said biasing means, and means to delay return of the passage connecting means to its first-named operating position by said biasing means after operation of said operable means and including a check valve in the fourth passage between the passage connecting means and said fluid supply means, the check valve permitting ready fluid flow from the fourth passage toward the fluid supply means and having a bleed port to permit restricted fluid flow from the fluid supply means to the fourth passage.

References Cited in the file of this patent

UNITED STATES PATENTS

| | | |
|---|---|---|
| 2,866,361 | Gatiss | Dec. 30, 1958 |
| 2,884,806 | Tuck | May 5, 1959 |
| 2,939,557 | Dabich et al. | June 7, 1960 |
| 2,965,202 | Christenson | Dec. 20, 1960 |
| 2,978,928 | Tuck et al. | Apr. 11, 1961 |
| 3,053,116 | Christenson et al. | Sept. 11, 1962 |
| 3,058,373 | Snoy et al. | Oct. 16, 1962 |
| 3,073,179 | Christenson | Jan. 15, 1963 |
| 3,073,183 | Kelley | Jan. 15, 1963 |